United States Patent [19]

Yamada et al.

[11] Patent Number: 5,645,760

[45] Date of Patent: Jul. 8, 1997

[54] POLYMERIC COMPOUNDS, AND LIQUID CRYSTAL ELEMENT USING THE SAME

[75] Inventors: Nobuaki Yamada, Higashiosaka; Shuichi Kozaki, Nara; Hoyo Mizobe, Soka; Masahiko Yoshida, Soka; Kenji Suzuki, Soka, all of Japan

[73] Assignees: Sharp Kabushiki Kaisha, Osaka; Kanto Kagaku Kabushiki Kaisha, Tokyo, both of Japan

[21] Appl. No.: 466,042

[22] Filed: Jun. 6, 1995

[30] Foreign Application Priority Data

Jun. 14, 1994 [JP] Japan .................. 6-132288

[51] Int. Cl.$^6$ .............. C09K 19/12; G02F 1/13; C08F 12/20; C08F 12/32
[52] U.S. Cl. .............. 252/299.66; 252/299.01; 526/251; 349/182
[58] Field of Search .............. 252/299.01, 299.66; 359/103; 526/251

[56] References Cited

U.S. PATENT DOCUMENTS

| 4,596,445 | 6/1986 | Fergason | 350/339 |
| 4,662,720 | 5/1987 | Fergason | 350/339 |
| 5,426,009 | 6/1995 | Cortes et al. | 252/299.01 |
| 5,518,652 | 5/1996 | Parri et al. | 252/299.01 |

FOREIGN PATENT DOCUMENTS

| 32 23 104 A1 | 6/1982 | Germany . |
| 42 26 994 A1 | 8/1992 | Germany . |
| 62-70406 | 3/1962 | Japan . |
| 58-501631 | 9/1983 | Japan . |
| 5-226322 | 12/1984 | Japan . |
| 61-502128 | 9/1986 | Japan . |
| 1-269922 | 10/1989 | Japan . |
| 2-99920 | 4/1990 | Japan . |
| 2-153318 | 6/1990 | Japan . |
| 2-153319 | 6/1990 | Japan . |
| 3-61925 | 3/1991 | Japan . |
| 3-278024 | 12/1991 | Japan . |
| 4-31824 | 2/1992 | Japan . |
| 4-212928 | 8/1992 | Japan . |
| 4-338923 | 11/1992 | Japan . |
| 5-11237 | 1/1993 | Japan . |
| 5-27242 | 2/1993 | Japan . |
| 5-257135 | 10/1993 | Japan . |
| 5-281519 | 10/1993 | Japan . |
| 2 267 501 | 6/1992 | United Kingdom . |
| 83/01016 | 3/1983 | WIPO . |
| 85/04262 | 9/1985 | WIPO . |
| 9322397 | 11/1993 | WIPO . |

OTHER PUBLICATIONS

CA 115:9618, 1990.
CA 113: 41443, 1990.
CA 112:199209, 1988.
CA 120:285236, 1993.
CA 89:215928, 1978.

Flüssige Kristalle in Tab., Dt. Verlag f. Grundstoffindustrie, Leipzig 1974.

Handbook of Liquid Crystals, Kelker, Hatz, Weinheim, pp. 35, 37 (1980).

*Primary Examiner*—Shean C. Wu
*Attorney, Agent, or Firm*—David G. Conlin; George W. Neuner

[57] ABSTRACT

The polymeric compound of this invention is represented by the following general formula (I):

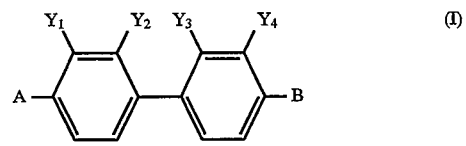

wherein A represents a hydrogen atom or

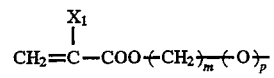

B represents a hydrogen atom or

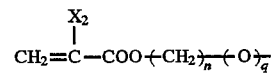

each of $X_1$ and $X_2$ represents independently a hydrogen atom or a methyl group, each of m and n represents independently an integer of 0 to 14, each of p and q represents independently 0 or 1, and each of $Y_1, Y_2, Y_3,$ and $Y_4$, represents independently a hydrogen atom or a fluorine atom, with the proviso that both A and B are not hydrogen atoms, p is 0 when m is 0, and q is 0 when n is 0. The liquid crystal display element of this invention includes a pair of substrates oppositely disposed with a gap therebetween, and a liquid crystal layer placed in said gap, at least one of said substrates being transparent, and said liquid crystal layer having a liquid crystal region, and a polymer wall surrounded by said liquid crystal region, wherein said liquid crystal layer includes a liquid crystal material, a polymeric polymer material, and the above-described polymeric compound. The liquid crystal display element prepared from the polymeric compound of this invention does not cause disclination lines, and has bright characteristics in the absence of an electric voltage.

7 Claims, 6 Drawing Sheets

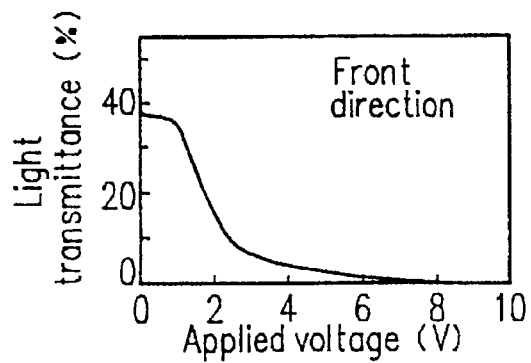
FIG. 7A
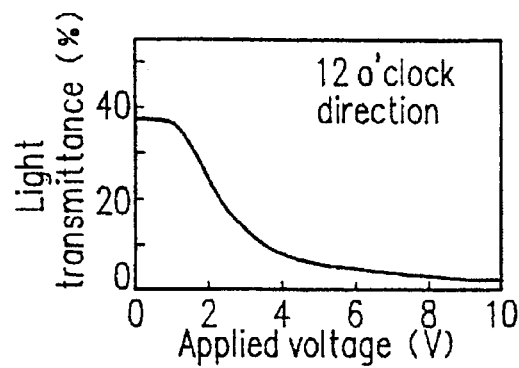
FIG. 7B
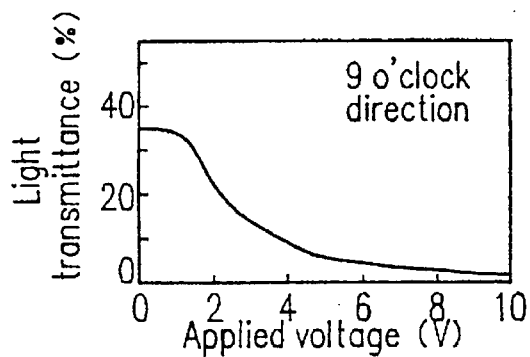
FIG. 7C
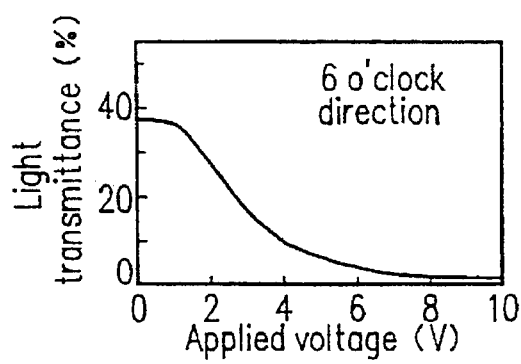
FIG. 7D
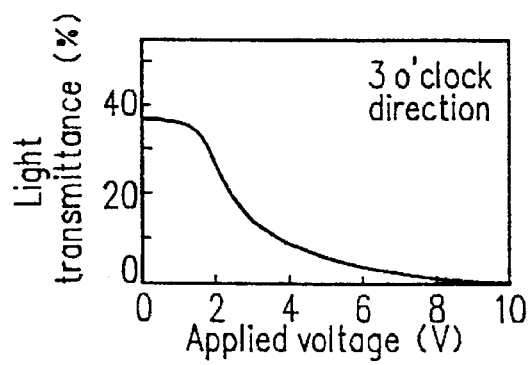
FIG. 7E
FIG. 7F
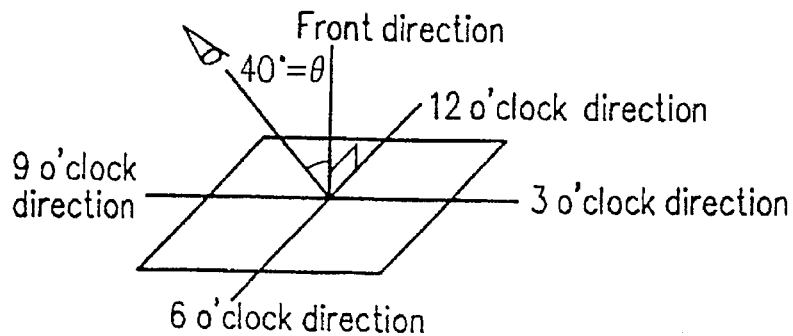

POLYMERIC COMPOUNDS, AND LIQUID CRYSTAL ELEMENT USING THE SAME

BACKGROUND OF THE INVENTION

1. Field of the Invention

The present invention relates to polymeric compounds which increase, in a liquid crystal display element comprising a liquid crystal layer having a polymer wall and a liquid crystal region substantially surrounded by said polymer wall, the orientation restricting force of a liquid crystal material present in said liquid crystal regions in an interface between said liquid crystal material and said polymer wall, and also relates to a liquid crystal display element using the polymeric compound. The liquid crystal display element of this invention can be utilized for personal display devices such as word processors, personal computers, and the like. The liquid crystal display element can also be utilized in devices used by a number of people such as portable information end devices, and the like.

2. Description of the Related Art

Liquid crystal display elements using a liquid crystal material and a polymer material (1) Japanese Laid-open National Patent Publication No. 58-501631 discloses a polymer dispersed liquid crystal display element which comprises a polymer material and a liquid crystal material encapsulated by the polymer material which displays the scattering state of an incident light by the refractive index difference between the liquid crystal material and the polymer material, and also displays the transparent state by the variation of the refractive index of the liquid crystal material with the impression of an electric voltage.

Japanese Laid-open National Patent Publication No. 61-502128 discloses a liquid crystal display element comprising a liquid crystal layer in which the phases of the liquid crystal material and the cured resin are three-dimensionally separated by irradiating a mixture of the liquid crystal material and the photocurable resin with ultraviolet ray.

These elements are basically liquid crystal display elements which control electrically the scattering-transparency variation of an incident light in the liquid crystal layer.

(2) Japanese Laid-open Patent Publication No. 1-269922 discloses a technique for preparing liquid crystal regions with different characteristics by first exposing to ultraviolet ray a liquid crystal layer comprising a photocurable resin and a liquid crystal material through a photo-mask, and further irradiating it with ultraviolet ray after remove the photo-mask. The element thus obtained is basically a scattering type element.

Japanese Laid-open Patent Publication No. 5-257135 discloses an element comprising a liquid crystal layer obtained by oppositely placing a substrate equipped with an alignment film having an orientation restricting force through a pair of gaps, injecting a mixture of a liquid crystal material and a photocurable resin into the gaps, and then irradiating the mixture with ultraviolet rays through a photo-mask disposed on the surface of said substrate. Since the inner portion of the liquid crystal layer in which the photo-mask is disposed has different threshold values and different optical characteristics obtained from the impression of an electric voltage from those of the outer portion of the liquid crystal layer, the element is a static driving element in which the pixel patterns are varied due to the electric voltage.

The principal behind the improvement of the viewing angle characteristics of a liquid crystal display element In order to improve the viewing angle characteristics of a liquid crystal display element, it is necessary to orient each of the liquid crystal molecule toward three or more different directions inside the pixels (liquid crystal regions). If each of the liquid crystal molecules inside the liquid crystal layer is oriented in three or more different directions, the apparent refractive index of each of the liquid crystal molecules is averaged in the gray scale state when viewing the pixels from both A and B directions as described in FIG. 1B. In other words, the contrast of the display element is substantially identical from both A and B directions. Therefore, the viewing angle characteristics of the element having such an orientation state of the liquid crystal as shown in FIG. 1B are improved, compared to those of the element having a TN mode shown in FIG. 2B.

Specific examples of the elements having a wide viewing angle mode (1) Japanese Laid-open Patent Publications Nos. 4-338923 and 4-212928 disclose a wide viewing angle mode comprising a combination of the aforementioned polymer dispersed liquid crystal element and polarizing plates, which are attached to both surfaces of the element such that each of the polarization axes of the plates are at a right angle to each other.

(2) As a method for improving the viewing angle characteristics of a non-scattering type liquid crystal display element using a polarizer, Japanese Laid-open Patent Publication No. 5-27242 discloses a method for preparing a composite material of a liquid crystal and a polymer from a mixture of the liquid crystal and a photocurable resin by the phase separation. According to this method, the orientation of the liquid crystal domains becomes random due to the polymer thus prepared. Therefore, because the liquid crystal molecules are oriented in different directions in each domain at the time of impressing an electric voltage, the apparent refractive indices viewed from each direction are substantially identical, and the viewing angle characteristics are improved in the gray scale state.

(3) In recent years, the present inventors have proposed a liquid crystal display element comprising a liquid crystal region in which the liquid crystal molecules are omnidirectionally (spirally) oriented in the portions where a photo-mask is present, and a polymer wall which consists mainly of a photocurable resin in the other portions. The liquid crystal region and polymer wall are formed by irradiating through the photo-mask a cell having a liquid crystal composition comprising the photocurable resin and the liquid crystal material. When the liquid crystal molecules of the liquid crystal display element are controlled by an electric voltage, the spiral orientation of the liquid crystal molecules will act as if an umbrella opened and closed to improve significantly the viewing angle characteristics.

In the interface between the polymer wall and the liquid crystal material of the element described in (3), disclination lines are generated due to the reverse tilt of the liquid crystal molecules at the time of impressing an electric voltage. Since the disclination lines are displayed as bright lines, the viewing angle characteristics of the element are deteriorated, when the display state is in a black state.

The prevent inventors have found that the addition of a polymeric compound to a mixture of the liquid crystal material and the photocurable resin in order to prevents the generation of the disclination lines in these elements. However, because the addition of the conventional polymeric compounds enlarges the pretilt angle of the liquid crystal material in the liquid crystal regions, the brightness of the element is reduced in the absence of an electric voltage.

The present inventors have eagerly examined the relationship between the structure of the polymeric compounds and the orientation of the liquid crystal molecules in the interface between the liquid crystal material and the polymer wall, and found a compound from which a liquid crystal display element is obtained generating no disclination lines and also having bright characteristics in the absence of an electric voltage.

SUMMARY OF THE INVENTION

The polymeric compound of this invention is represented by the following general formula (I):

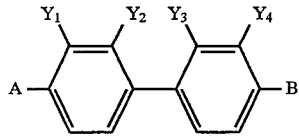

wherein A represents a hydrogen atom or

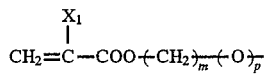

B represents a hydrogen atom or

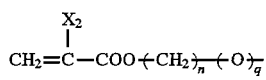

each of $X_1$ and $X_2$ represents independently a hydrogen atom or a methyl group, each of m and n represents independently an integer of 0 to 14, each of p and q represents independently 0 or 1, and each of $Y_1$, $Y_2$, $Y_3$, and $Y_4$ represents independently a hydrogen atom or a fluorine atom, with the proviso that both A and B are not hydrogen atoms, p is 0 when m is 0, and q is 0 when n is 0.

In a preferred embodiment, in the general formula (I) A represents:

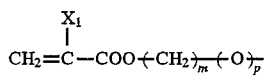

and B represents:

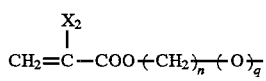

In a preferred embodiment, in the general formula (I) either A or B represents a hydrogen atom.

In a preferred embodiment, in the general formula (I) A represents a hydrogen atom or:

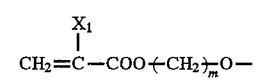

and B represents a hydrogen atom or:

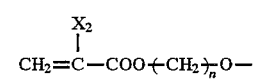

In a preferred embodiment, in general formula (I) both p and q represent 1.

In a preferred embodiment, in the general formula (I) A represents:

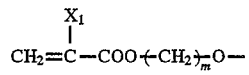

and B represents a hydrogen atom. Alternatively, represents a hydrogen atom and B represents:

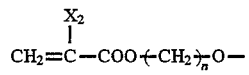

In a preferred embodiment, in the general formula (I) at least one selected from the group consisting of $Y_1$, $Y_2$, $Y_3$ and $Y_4$ is a fluorine atom.

The liquid crystal display element of this invention comprises a pair of substrates oppositely disposed through a gap, and a liquid crystal layer placed in the gap. At least one of the substrates is transparent, and the liquid crystal layer includes a liquid crystal region, and a polymer wall surrounding the liquid crystal region, wherein the liquid crystal layer includes a liquid crystal material, a polymeric polymer material, and the above-described polymeric compound.

In a preferred embodiment, the liquid crystal region includes liquid crystal molecules, and the orientation of the liquid crystal molecules is either random, radial, concentric or spiral.

In a preferred embodiment, an alignment film is placed on the substrates.

In a preferred embodiment, the liquid crystal region includes liquid crystal molecules, and the orientation of the liquid crystal molecules is TN, STN, ECB or FLC.

In a preferred embodiment, the polymeric polymer material is a photocurable resin.

In a preferred embodiment, the polymeric compound is represented by the general formula (I), wherein either A or B represents a hydrogen atom.

In a preferred embodiment, the polymeric compound is represented by the general formula (I), wherein A represents:

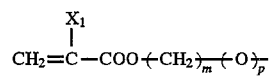

and B represents:

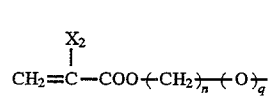

When a display mode utilizing an orientation restricting force on the substrate is prepared from a mixture of a liquid crystal material and a polymeric polymer material such as a photocurable resin, the orientation restricting force of the alignment film to the liquid crystal molecules generally tends to be weakened due to the formation of a polymer layer consisting of the polymeric polymer material between the alignment film and the liquid crystal region. However, when the polymeric compound of this invention is contained in the polymer layer, an ability of transferring the orientation restricting force of the alignment film to the liquid crystal molecules inside the liquid crystal regions is also created in the polymer layer to stabilize the orientation of the liquid crystal molecules, due to the presence of a material having a structure similar to the liquid crystal material in the polymer layer.

When the liquid crystal molecules present inside the liquid crystal region are oriented symmetrical with respect to the axis (an axis which is at a right angle to the surface of the substrate), disclination lines are normally generated on the periphery of the liquid crystal region due to the reverse tilt (See, FIGS. 2A–2C) at the time of impressing an electric voltage. However, because the addition of the polymeric compound of this invention results in the generation of the pretilt of the liquid crystal molecules on the substrate, the generation of the disclination lines is controlled at the time of impressing an electric voltage which deteriorate the black display level. Thus, the contrast of the display element is dramatically improved.

Therefore, the invention described herein makes possible the advantages of providing a liquid crystal display element which has the following effects.

(1) Since the liquid crystal regions are surrounded by the polymer wall, the gap is maintained between both substrates by the polymer wall. Therefore, it is possible to control the deformation of the liquid crystal display element against an external force, especially to control the variation of its color which results when the surface of the element is pressed by a pen.

(2) The conventional large screen liquid crystal display elements which are placed vertically have different thicknesses in the upper and lower portions due to the presence of gravity. This causes the unevenness of the display. However, because the substrates of the liquid crystal display element of this invention are attached throughout the whole surface of the element, the thickness of the cell is not often varied.

(3) It is possible to make the orientation of the liquid crystal molecules in the liquid crystal regions random, concentric, radial or spiral by utilizing effectively the phase separation between the liquid crystal material and the polymer wall consisting mainly of the polymeric polymer materials at the time of curing the liquid crystal composition. Since the liquid crystal of the liquid crystal regions is oriented symmetrically to the axis, the liquid crystal display element thus obtained has excellent viewing angle characteristics.

(4) It is possible to strengthen the orientation restricting force in the interface between the liquid crystal material and the polymer layer by using the polymeric compound of this invention.

(5) The liquid crystal display element of this invention is suitable for personal display devices such as word processors, personal computers, and the like; and devices used by a number of people (especially, those used on a desk surrounded by 2–4 people) such as portable information end devices, and the like.

These and other advantages of the present invention will become apparent to those skilled in the art upon reading and understanding the following detailed description with reference to the accompanying Figures.

BRIEF DESCRIPTION OF THE DRAWINGS

FIGS. 7A–7F are a series of graphs showing the electrooptical characteristics (viewing angle characteristics) of the element prepared in Example 9.

DESCRIPTION OF THE PREFERRED EMBODIMENTS

The polymeric compound of this invention has a functional group reactive with a polymeric polymer material, including monofunctional polymeric compounds and polyfunctional polymeric compounds.

1. The Monofunctional Polymeric Compounds

A. Structure

The monofunctional polymeric compound is a compound in which one polymeric functional group is present in its molecule and bonded to a mesogen group having liquid crystal properties.

B. Effects

The following illustrate the effects attained by the use of the polymeric compound.

When a display mode utilizing an orientation restricting force on the substrate is prepared from a mixture of a liquid crystal material and a polymeric polymer material such as a photocurable resin, the orientation restricting force of the alignment film to the liquid crystal molecules generally tends to be weakened due to the formation of a polymer layer consisting of the polymeric polymer material between the alignment film and the liquid crystal region. However, when the polymeric compound of this invention is contained in the polymer layer, an ability to transfer the orientation restricting force of the alignment film to the liquid crystal molecules inside the liquid crystal region is also created in the polymer layer to stabilize the orientation of the liquid crystal molecules. This is due to the presence of a material having a structure similar to the liquid crystal material in the polymer layer.

Figure 1A:
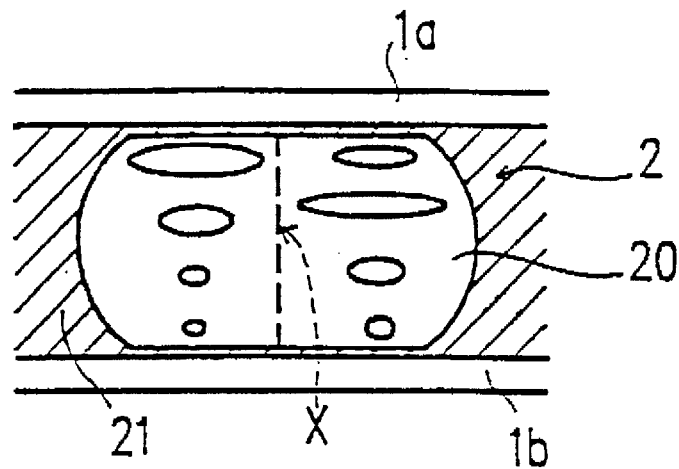
FIGS. 1A–1C illustrate an enlarged view showing the liquid crystal region of the liquid crystal display element of this invention.
Figure 3:
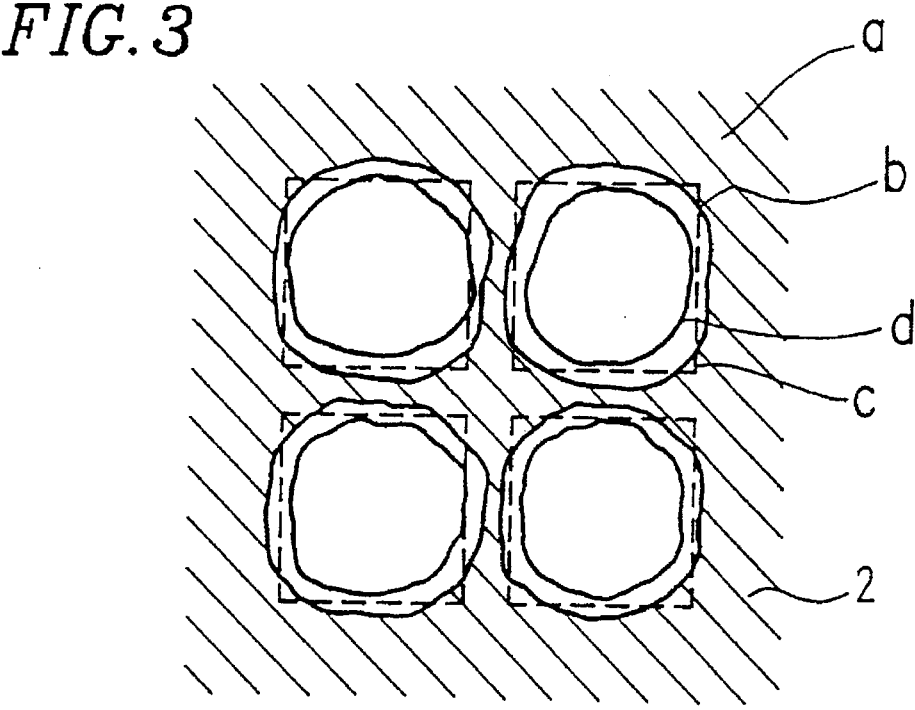
FIG. 3 is a diagram showing the generation of the disclination lines at the time of impressing an electric voltage.

When the liquid crystal molecules present inside the liquid crystal region are oriented symmetrical with respect to the axis (the axis X which is shown in FIG. 1A and is at a right angle of the surface of the substrate), the disclination lines d are normally generated on the periphery of the liquid crystal region due to the reverse tilt (See, FIG. 3) at the time of impressing an electric voltage. However, because the addition of the polymeric compound of this invention results in the generation of the pretilt of the liquid crystal molecules on the substrate, the generation of the disclination lines is controlled at the time of impressing an electric voltage (which is estimated to be due to the fact that the liquid crystal molecules are oriented nearly at a right angle at the time of impressing the electric voltage).

C. The influence derived from the variation of the chain length of the linking groups in the polymeric compound The numbers, n and m of the linking groups, —$(CH_2)_m$— or —$(CH_2)_n$— which connect the mesogen group to the polymeric functional group may influence the viewing angle characteristics of the liquid crystal display element thus prepared.

In the above formula, m and n are 0 to 14, respectively. Preferably, m and n are 0 or 3 to 14 and more preferably 4 to 7, respectively. If both m and n are 2, the polymeric compound is too reactive to be practical. If both m and n exceed 14, the mesogen portions appear on the surfaces of the polymer wall and the polymer layer so that the response speed is reduced, which is estimated to be due to the fact that the mesogen groups are oriented in the same manner as the liquid crystal molecules. The longer the chain length of the linking groups is, the smaller the amount of the polymeric compound required to obtain an effect on controlling the disclination lines. However, at the same time, the pretilt angle is enlarged to reduce the transmittance of the cell. Thus, it is necessary to select the amounts added and types of the polymeric compound so as to control the disclination lines and also prevent the pretilt angle from enlarging.

D. The effects of the fluorination of the polymeric compound on the viewing angle characteristics of the element There will be the following problems (a)–(d) arising in an element comprising a liquid crystal layer having a liquid crystal region and a polymer wall surrounding the liquid crystal region, the liquid crystal region and the polymer wall being formed by the phase separation of a mixture of a liquid crystal material and a polymeric polymer material by the polymerization reaction.

Problems Estimated Causes (a) Slow response speed—The dissolution of the polymer material, monomers in the liquid crystal;

(b) The generation of hysteresis—The strong anchoring strength of the liquid crystal molecules to the polymer wall;

(c) High driving voltage—The same as above item (b)

(d) The leakage of the light at the time of impressing a saturation voltage—The dissolution of the liquid crystal molecules in the polymer layer inside the liquid crystal region, and the strong anchoring strength of the liquid crystal molecules to the polymer wall.

The causes of the above-described problems are due to the strong anchoring strength of the liquid crystal molecules to the polymer wall, as well as the good compatibility between the polymer material and the liquid crystal material. Both of these problems may be solved by the use of a fluorinated polymeric compound. Since the fluorinated polymeric compound is expected to appear on the surfaces of the polymer wall and the polymer layer, the orientation of the liquid crystal may be stabilized.

2. The Polyfunctional Polymeric Compounds

A. Structure

The polyfunctional polymeric compound is a compound in which a plurality of the polymerizable functional groups are bounded to the mesogen group having liquid crystal properties. The number of the functional groups is preferably 2. If it is 3 or more, the polymer wall is formed before the liquid crystal region is largely developed due to the fact that the gelation speed of the liquid crystal material becomes faster, and therefore the transmittance of the liquid crystal display element thus prepared is reduced in the absence of an electric voltage.

The numbers, n and m, of the linking groups —$(CH_2)_m$— or —$(CH_2)_n$— which connect the above-described mesogen group to the polymeric functional group are the same as those for the above-described monofunctional polymeric compound, but are preferably 12 or less. If they exceed 12, the solubility of the polymeric compound in the liquid crystal material is reduced.

B. Effects

Figure 4:
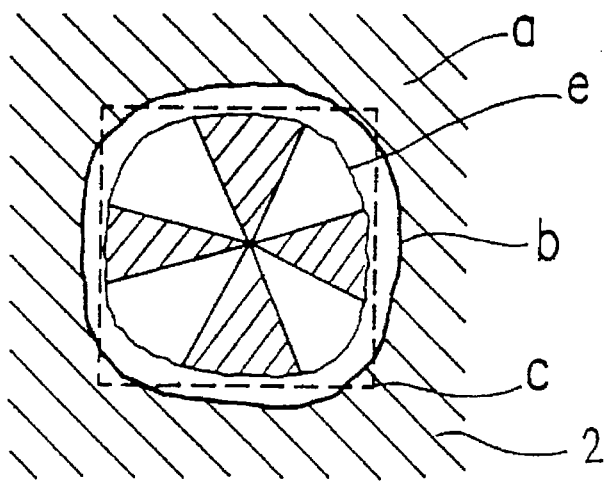
FIG. 4 is an enlarged diagram showing the liquid crystal region using a bifunctional polymeric compound.

Like the monofunctional polymeric compound, the polyfunctional polymeric compound has an effect on stabilizing the orientation of the liquid crystal molecules. Moreover, with respect to the generation of disclination lines, the polyfunctional polymeric compound provides an observed image which has a region having a smaller amount of twisting, as is shown in FIG. 4, than obtained by the use of the monofunctional polymeric compound, and generates no disclination lines at the time of impressing an electric voltage.

The use of a fluoridized polyfunctional polymeric compound provides the same effects as those of the monofunctional polymeric compound. In this case, the site which is fluoridized may be located on the carbon inside the mesogen backbone.

3. Retardation: $d \cdot \Delta n$, $d$:Thickness of the Liquid Crystal Layer, $\Delta n$ :Birefringence Since the liquid crystal molecules are nearly upright to the substrate (when $\Delta \epsilon > 0$) in the liquid crystal display element of this invention having a polarizer at the time of impressing a saturation voltage, (1) the polarizer has viewing angle characteristics, and (2) the liquid crystal layer has retardation of $d \cdot \Delta n$. Therefore, there is a region having poor viewing angle characteristics in the direction of 45° from the polarization axis of the polarizer.

The cause of the above-described problem (2) is that light entering from the polarization direction of the polarizer has either an ordinary ray only or an extraordinary ray only in crossing the refractive index ellipsoid of the liquid crystal layer, and incident light entered in the direction of 45° from the polarization axis of the polarizer has both an ordinary ray and an extraordinary ray in crossing the refractive index ellipsoid of the liquid crystal layer. This causes leakage of the light due to the generation of elliptic polarization. Thus, it is preferred that the retardation of the liquid crystal layer be as small as possible so that the elliptic polarization is not easily produced. However, because the transmittance $T_o$ in the absence of an electric voltage is influenced by the retardation of the liquid crystal layer, it is preferred in view of ensuring the omnidirectional properties of the viewing angle characteristics and the brightness of the cell that the retardation of the liquid crystal layer be 300 nm to 650 nm. If the retardation is less than 300 nm, the cell shows a dark display due to the lack of the brightness in the absence of an electric voltage. It is preferred that the twist angle be 45° to 150°, and especially be in the neighborhood of 90° which satisfies the first minimum conditions because the cell has the highest brightness at this angle.

4. Liquid Crystal Display Elements

Figure 1B:
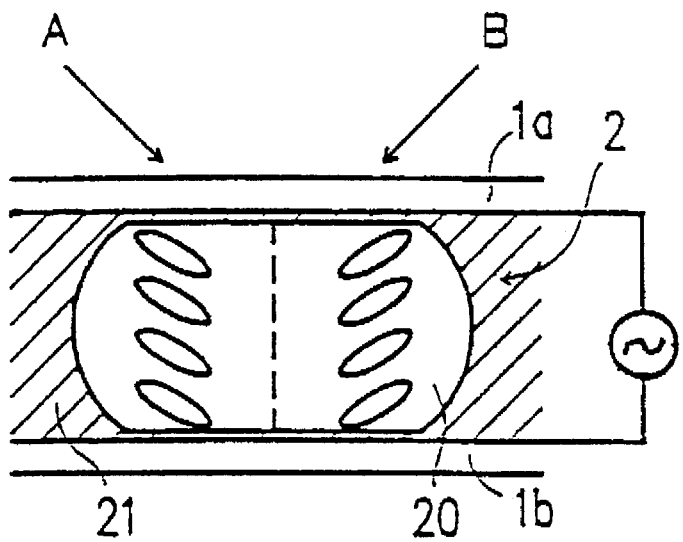
Figure 1C:
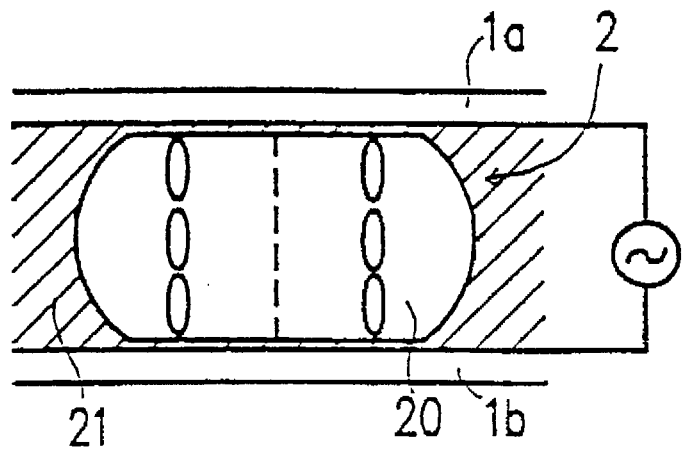
Figure 2A:
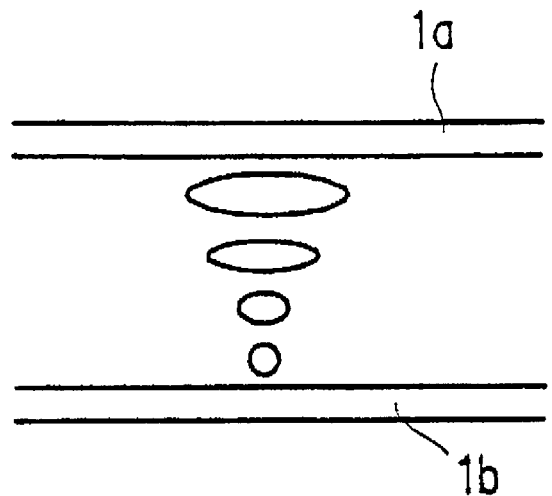
FIGS. 2A–2C illustrate a diagram showing the viewing angle characteristics of a TN mode element.
Figure 2B:
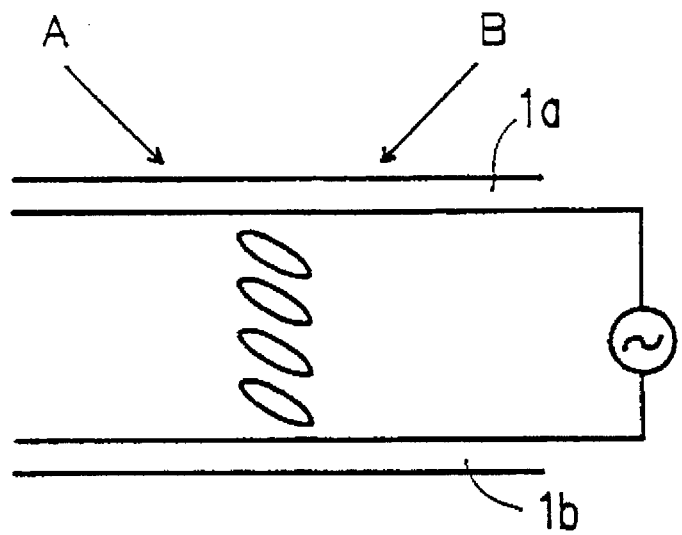
Figure 2C:
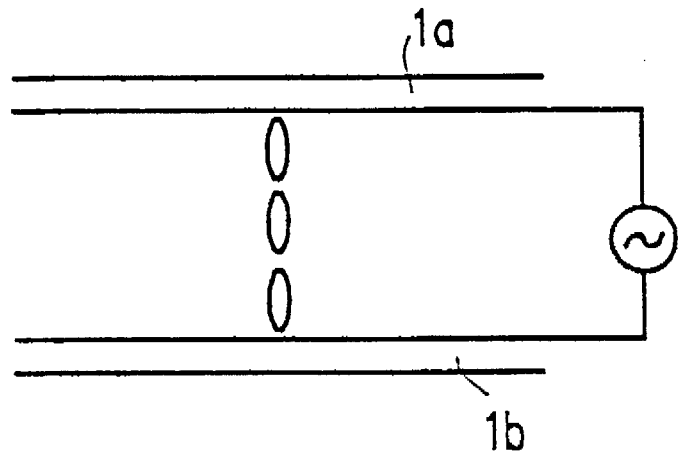

The liquid crystal display element of this invention comprises two substrates 1a and 1b, both of which are oppositely placed with a gap therebetween, and a liquid crystal layer 2 placed inside the gap, as shown in FIG. 1. At least one of the two substrates 1a and 1b may be transparent. The liquid crystal layer 2 has a number of liquid crystal regions 20, and a polymer wall 21 surrounding the liquid crystal regions 20. An exemlary, liquid crystal display element is prepared as follows.

Figure 5:
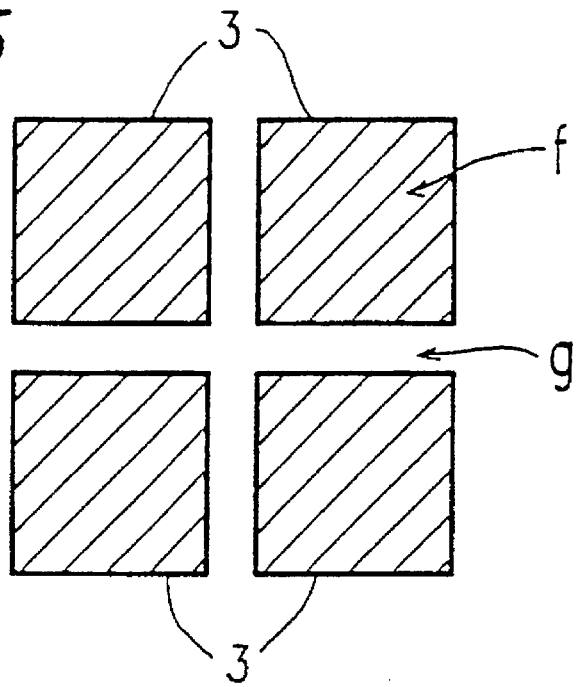
FIG. 5 is a diagram of the photo-mask used in Example 9.
Figure 6:
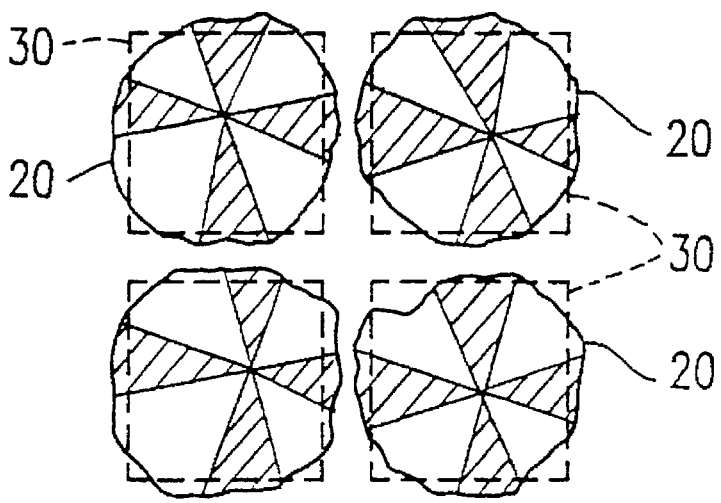
FIG. 6 is an enlarged diagram of the cell prepared in Example 9.
Figure 8A:
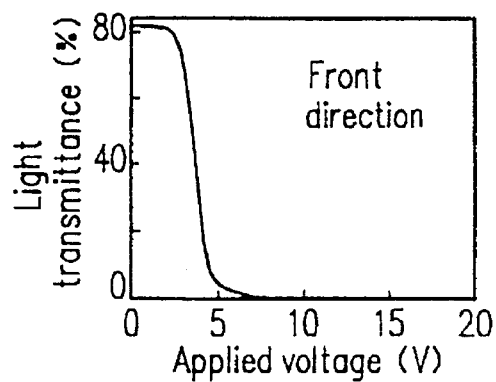
FIGS. 8A–8F are a series of graphs showing the electrooptical characteristics (viewing angle characteristics) of a TN mode element.
Figure 8B:
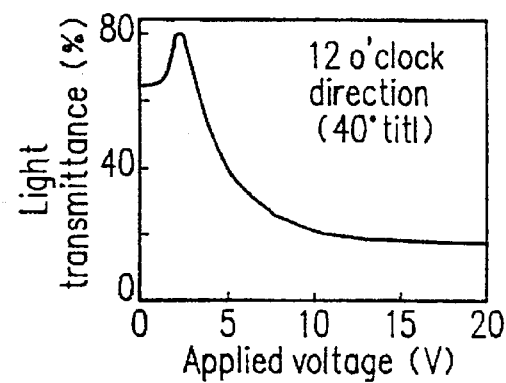
Figure 8C:
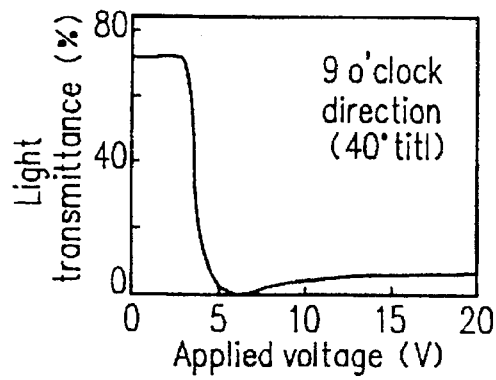
Figure 8D:
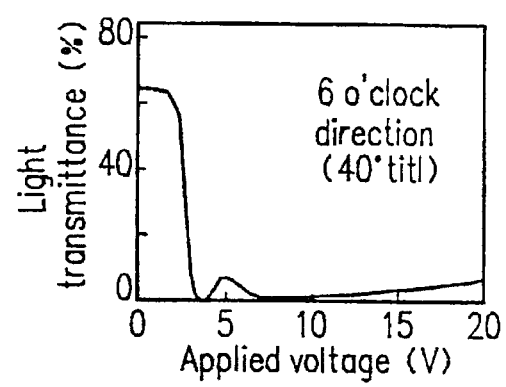
Figure 8E:
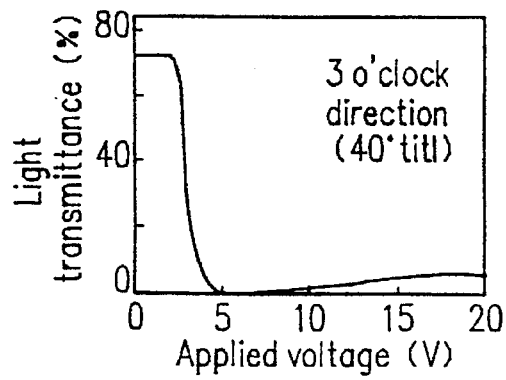
Figure 8F:
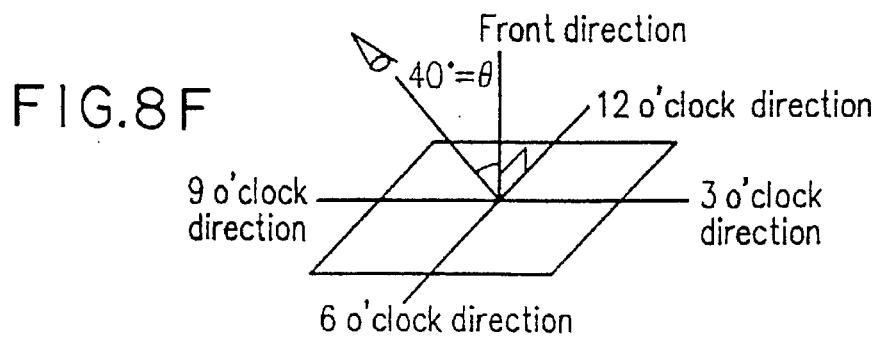

Two substrates in which transparent electrodes are provided are placed with a gap therebetween by the use of a spacer to form a cell. On one side of the cell, a photo-mask 3 is disposed as shown in FIG. 5. A liquid crystal composition containing a liquid crystal material, a polymeric polymer material, and at least one of the above-described polymeric compounds is injected into the cell. Then, the cell is irradiated with ultraviolet ray on the photo-mask side while impressing an electric voltage between the transparent electrodes. The polymeric polymer material and polymeric compounds in the liquid crystal composition in the cell are polymerized and cured by the irradiation of the ultraviolet ray. In the process of the polymerization, the phases of the liquid crystal material and the polymeric polymer material in the liquid crystal composition are separated to form liquid crystal regions 20 surrounded by polymer walls consisting of the polymeric polymer material and the polymeric compounds in portions 30 which correspond to the above-described photo-mask, as shown in FIG. 6.

Polymeric polymer materials which can be used in the above-described display element include known polymerizable resins which are preferably photocurable resins.

These photocurable resins include, for example, acrylic acids and acrylates having a long chain alkyl group of 3 or more carbons or a benzene ring, including isobutyl acrylate, stearyl acrylate, lauryl acrylate, isoamyl acrylate, n-butyl methacrylate, n-lauryl methacrylate, tridecyl methacrylate, 2-ethylhexyl acrylate, n-stearyl methacrylate, cyclohexyl methacrylate, benzyl methacrylate, 2-phenoxyethyl methacrylate, isobornyl acrylate, isobornyl methacrylate, and the like. The photocurable resins also include polyfunctional resins to increase the physical strength of the polymer material such as bisphenol A dimethacrylate, bisphenol A diacrylate, 1,4-butanediol dimethacrylate, 1,6-hexanediol dimethacrylate, trimethylolpropane trimethacrylate, trimethylolpropane triacrylate, tetramethylolmethane tetracrylate, neopentyl diacrylate, and the like.

5. Driving Methods

The liquid crystal display element thus prepared may be driven by a driving method such as simple matrix driving and active driving method including for example a-Si TFT, p-Si TFT, MIM, and the like, but the driving method is not particularly limited in the present invention.

6. Substrate Materials

The substrate materials that can be used in the present invention include glass plates, plastic plates, and the like which are made from transparent solids, and substrates with a thin metal film, Si substrates, and the like which are made from non-transparent solids. The substrates with a thin metal film are effective for a reflection type liquid crystal display element.

The plastic substrate is preferably made from a material which does not absorb visible light, including for example PET, acrylic polymers, polystyrenes, polycarbonates, and the like. Also, when the plastic substrate is used, the polarization ability may be imparted to the substrate itself.

Moreover, a laminated substrate made by combining two types of different substrates, or a laminated substrate made by combining two substrates of either the same or different types having different thicknesses may also be used.

The following illustrate the outline of a method for synthesizing the above-described polymeric compound. The following synthesis routes are illustrative examples, and the present invention is not limited to these examples.

7. Synthesis Routes

Synthesis route 1: The compound represented by the general formula (I);

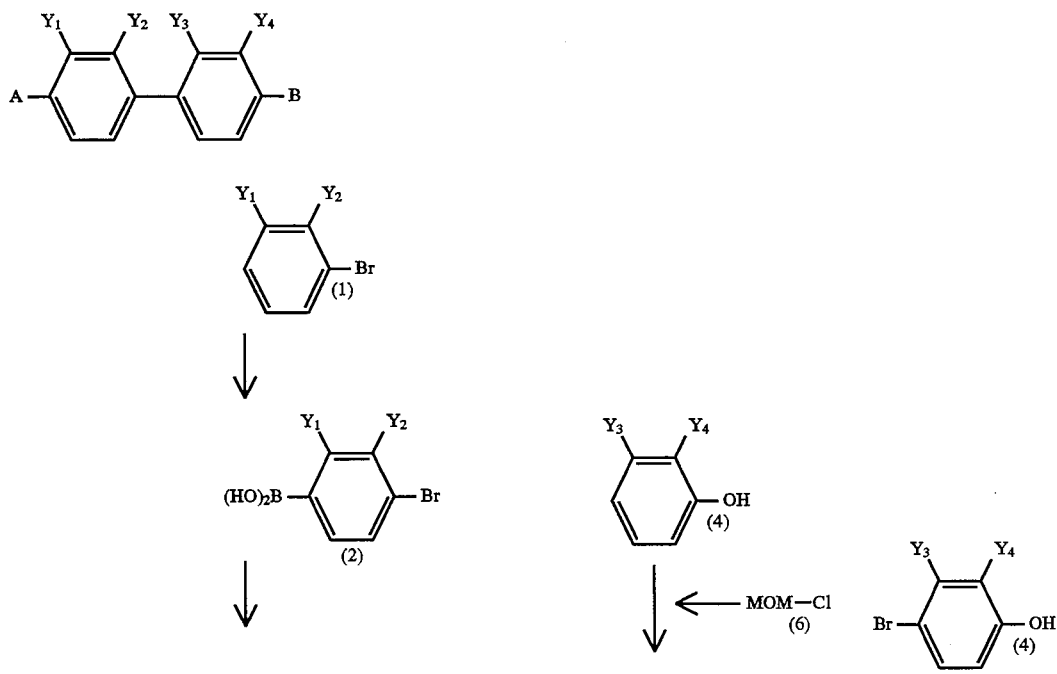

11 12
-continued
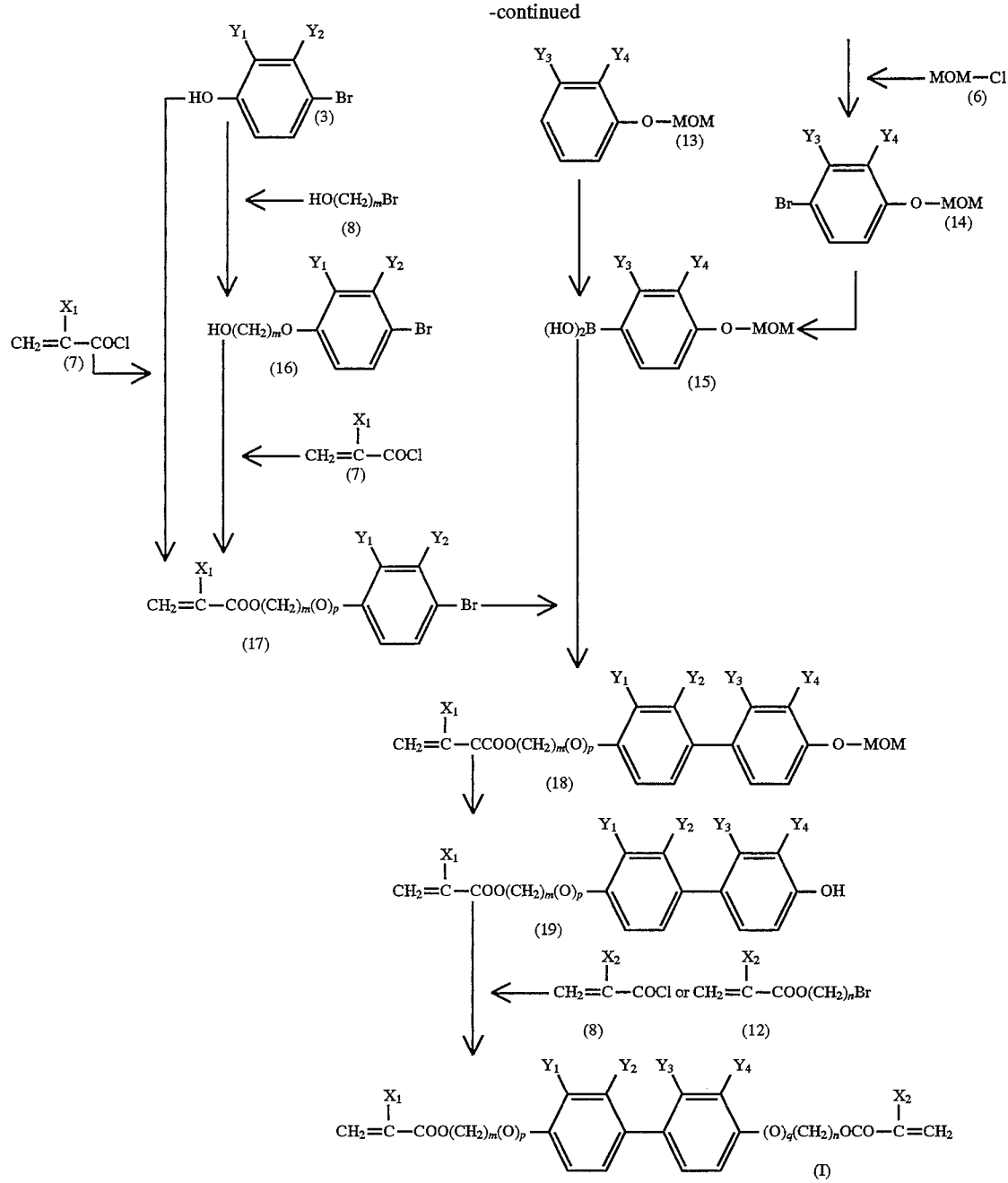
(Note) The symbol, MOM indicates $CH_3OCH_2-$ group
Synthesis route 2: The compound represented by the general formula (I), wherein A and B are the same group;
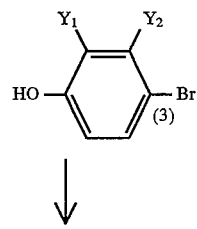

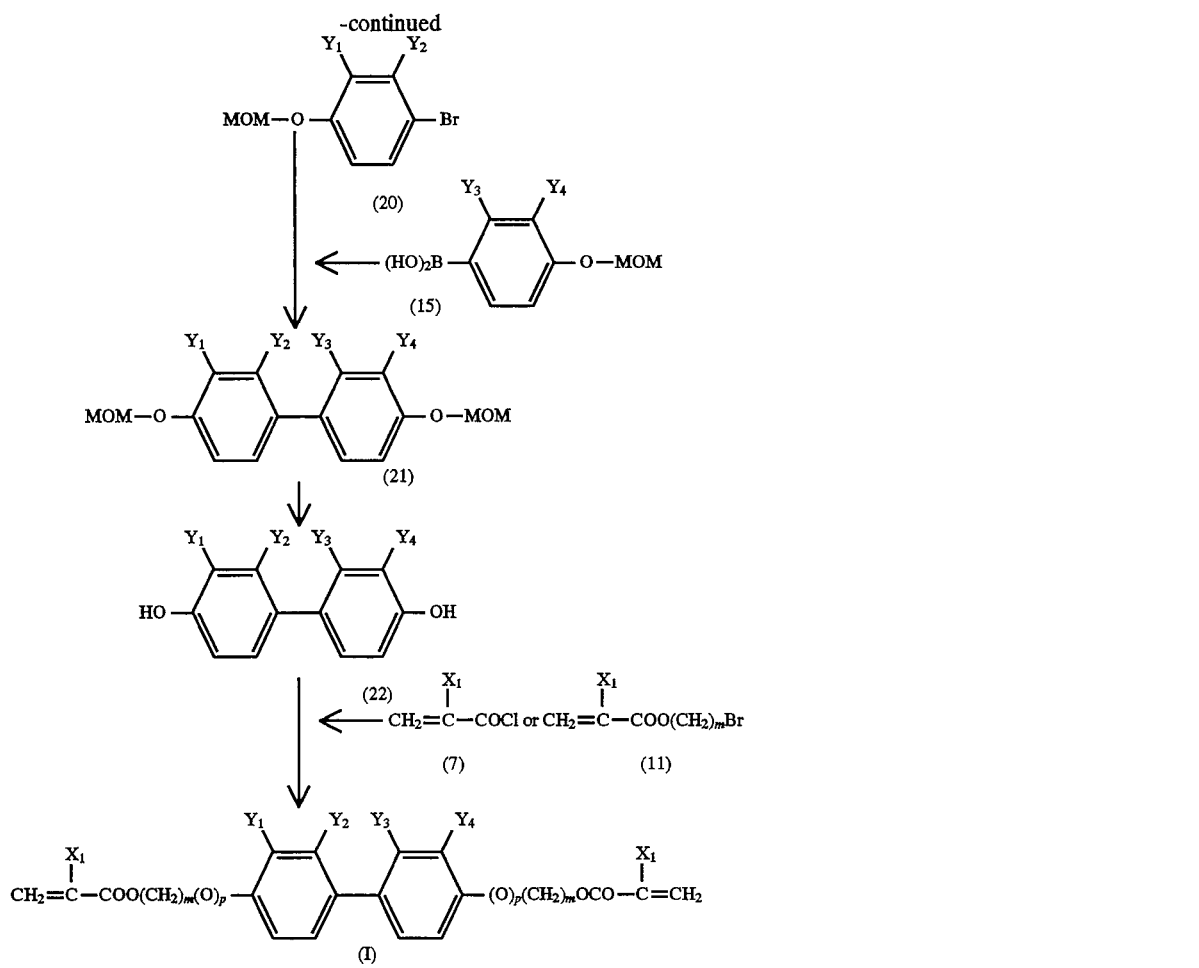
Synthesis route 3: The compound represented by the general formula (I), wherein either A or B is hydrogen atom;
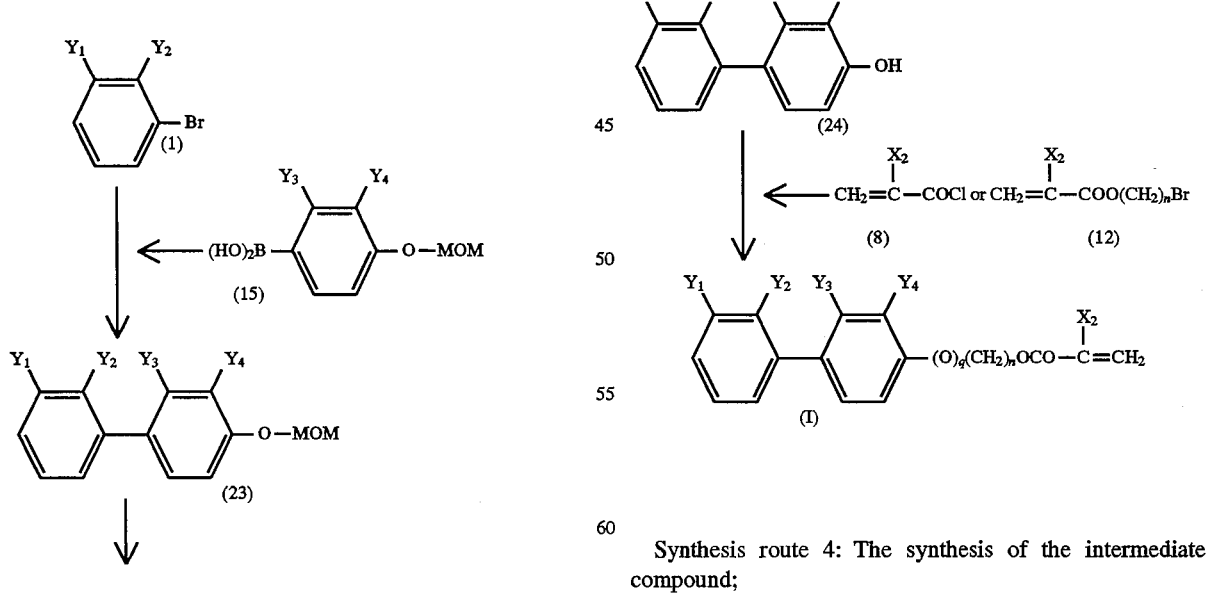
Synthesis route 4: The synthesis of the intermediate compound;

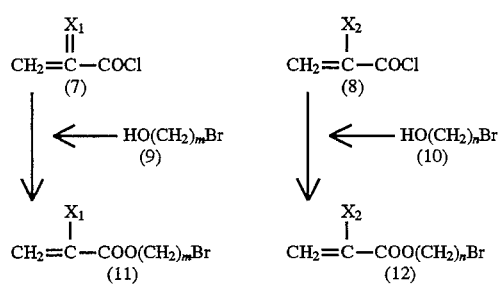

The following outline the synthesis routes 1–4.

Synthesis route 1

The compounds represented by the general formulae (1), (4), (5), (6), (7) and (8) are commercially available. Also, the compound represented by the general formula (3), where each of $Y_1$ and $Y_2$ is a hydrogen atom or a fluorine atom is also commercially available.

The compound represented by the general formula (1) is reacted with $C_4H_9Li$ and thereafter with $B(OCH_3)_3$, and hydrolyzed to obtain the compound represented by the general formula (2) which is then oxidized using hydrogen peroxide to obtain the compound represented by the general formula (3).

The compound represented by the general formula (3) is etherified with the compound represented by the general formula (8) to obtain the compound represented by the general formula (16) which is then esterified with the compound represented by the general formula (7), or the compound represented by the general formula (3) is directly esterified with the compound represented by the general formula (7) to obtain the compound represented by the general formula (17).

The compound represented by the general formula (4) is etherified with methoxymethyl chloride (MOM-Cl) to obtain the compound represented by the general formula (13) which is then reacted with $C_4H_9Li$ and thereafter with $B(OCH_3)_3$, and hydrolyzed to obtain the compound represented by the general formula (15). Also, the compound represented by the general formula (5) is etherified with MOM-Cl to obtain the compound represented by the general formula (14) which is then reacted with magnesium (Mg) to form a Grignard reagent. The compound represented by the general formula (15) may also be obtained by reacting the Grignard reagent with $B(OCH_3)_3$.

The compound represented by the general formula (17) which is obtained by the above-described procedure is coupled with the compound represented by the general formula (15) in the presence of a palladium (Pd) catalyst to obtain the compound represented by the general formula (18).

The methoxymethyl (MOM) group of the compound represented by the general formula (18) is eliminated under the acidic conditions to obtain the compound represented by the general formula (19) which is then esterified or etherified with the compound represented by the general formula (8), or the compound represented by the general formula (12) (Synthesis route 4), respectively to obtain the compound represented by the general formula (I).

Synthesis route 2

The compound represented by the general formula (20) which is obtained by etherifying the compound represented by the general formula (3) with MOM-Cl is coupled with the compound represented by the general formula (15) which is obtained in the above-described synthesis route 1 in the presence of a Pd catalyst to obtain the compound represented by the general formula (21).

The MOM group of the compound represented by the general formula (21) is eliminated under the acidic conditions to obtain the compound represented by the general formula (22). The compound represented by the general formula (22) is esterified or etherified with the compound represented by the general formula (7) or the compound represented by the general formula (11) (Synthesis route 4), respectively to obtain the compound represented by the general formula (I), wherein A and B are the same group.

Synthesis route 3

The compound represented by the general formula (1) is coupled with the compound represented by the general formula (15) in the presence of a Pd catalyst to obtain the compound represented by the general formula (23). The MOM group of the compound represented by the general formula (23) is eliminated under the acidic conditions to obtain the compound represented by the general formula (24).

The compound represented by the general formula (24) is esterified or etherified with the compound represented by the general formula (8) or the compound represented by the general formula (12), respectively, to obtain the compound represented by the general formula (I), wherein either A or B is a hydrogen atom.

Synthesis route 4

The commercially available compound represented by the general formula (9) is esterified with the compound represented by the general formula (7) to obtain the compound represented by the general formula (11). Also, the compound represented by the general formula (10) is esterified by the compound represented by the general formula (8) to obtain the compound represented by the general formula (12).

EXAMPLES

The following are illustrative examples of the present invention. However, the present invention is not intended to be limited to these examples.

Additionally, the abbreviations described in the present examples indicate the following:

GC; Gas chromatography

HPLC; High-performance liquid chromatography

TLC; Thin layer chromatography

IR; Infrared absorption spectrum

Mass; Mass spectrum b.p.; Boiling point m.p.; Melting point

GTO; Glass tube oven

Y; Yield

Example 1

(a) The synthesis of

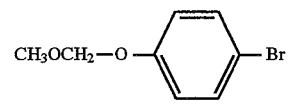

Into a reactor, 40 g of p-bromophenol and 200 ml of DMF (dimethylformamide) were charged, to which 10 g of a 60% NaH (sodium hydride) were gradually added to give a solution. To the solution, 18 g of methoxymethyl chloride were added dropwise with stirring at a temperature of 30° C. or lower, and reacted overnight at room temperature to give a reaction solution. The reaction solution was poured into water, extracted with benzene, washed with water, dried over sodium sulfate anhydride, and thereafter the solvent was evaporated and the residue was distilled under reduced pressure to give 38.4 g (Y., 79.3%) of 4-bromopheny methoxymethyl ether. b.p.; 65°–67° C./0.6 mmHg GC; 99.4%

(b) The synthesis of

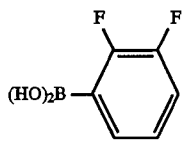

Into a reactor, 100 g of 1,2-difluorobenzene and 350 ml of THF (tetrahydrofuran) were charged under an argon stream, to which 700 ml of a 1.6M $C_4H_9Li$ (butyl lithium)/hexane solution were added dropwise with stirring at a temperature of –50° C. to –60° C. and stirred at the same temperature for 1 hour to give a solution. Thereafter, 175 g of $(CH_3O)_3B$ (trimethyl borate) were added dropwise, and stirred at the same temperature for 1 hour.

The mixture was stirred overnight while reducing the temperature gradually to room temperature. Thereafter, the mixture was cooled to 0° C., to which a dilute hydrochloric acid was added to give a reaction solution.

The reaction solution was extracted with toluene, washed with water, dried over sodium sulfate anhydride, and thereafter the solvent was evaporated and the crystallized residue was immersed into and washed with hot hexane to give 80.8 g (Y., 56.6%) of 2,3-difluorophenyl boronic acid. HPLC; 99.5%

(c) The synthesis of

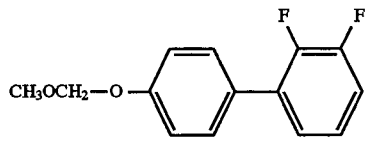

Into a reactor, 5.1 g of $Pd(PPh_3)_4$ (tetrakistriphenylphosphine palladium), 210 ml of a benzene solution of 33 g of 4-bromopheny methoxymethyl ether obtained in the above-described synthesis (a), 135 ml of a 2M aqueous solution of $Na_2CO_3$, and 120 ml of an ethanol solution of 24 g of 2,3-difluorophenyl boronic acid obtained in the above-described synthesis (b) were charged under an argon stream, and stirred for 6 hours under reflux condition to give a reaction solution. The reaction solution was poured into water, extracted with toluene, washed with water, dried over sodium sulfate anhydride, and thereafter the solvent was evaporated and the residue was distilled under reduced pressure to give 20.1 g (Y., 53.6%) of 2,3-difluoro-4'-(methoxymethyl)biphenyl. b.p.; 110°–120° C./0.25 mmHg GC; 96.0%

(d) The synthesis of

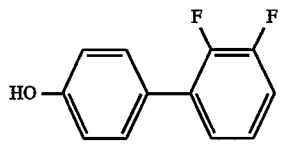

Into a reactor, 20.1 g of 2,3-difluoro-4'-(methoxymethyl)biphenyl obtained in the above-described synthesis (c), 60 ml of THF, and 90 ml of a 6N-HCl were charged, and stirred for 3 hours under reflux condition to give a reaction solution. The reaction solution was cooled, and thereafter extracted with toluene, washed with water, dried over sodium sulfate anhydride, and the solvent was evaporated and the residue was distilled under reduced pressure to give 9.0 g (Y., 54.3%) of 2,3-difluoro-4'-hydroxybiphenyl. b.p.; 160°–170° C./18 mmHg m.p.; 132°–134.4° C. GC; 99.7%

(e) The synthesis of

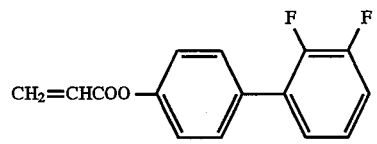

Into a reactor, 4.0 g of 2,3-difluoro-4'-hydroxybiphenyl obtained in the above-described synthesis (d), 2.0 g of triethylamine, and 300 ml of benzene were charged, to which a solution of 1.9 g of acryloyl chloride in 100 ml of benzene was added dropwise, and stirred for 5 hours to give a reaction solution. The reaction solution was washed with a 3N-hydrochloric acid and then with water, and thereafter dried over sodium sulfate anhydride, and the solvent was evaporated and the residue was purified by the silica gel column chromatography (eluent; toluene), and then recrystallized from hexane to give 4.5 g (Y., 88.5%) of 2,3-difluorobiphenyl-4'-yl acrylate. m.p.; 88.4°–90.0° C.

The purity of this material was 99.2% measured by GC, 99.5% measured by HPLC, and 1 spot measured by TLC. Also, according to the results of the IR measurement, the fact that a molecular ion peak was observed in 260 by the Mass analysis, and the types of the starting materials used, the resulting material was identified as a marked material.

Example 2

(a) The synthesis of $CH_2$=$CHCOO(CH_2)_6Br$

Into a reactor, 30 g of 6-bromo-1-hexanol, 18.4 g of triethylamine, and 500 ml of benzene were charged, to which a solution of 16.5 g of acryloyl chloride in 200 ml of benzene was added dropwise, while stirring and cooling with ice, and stirred for 3 hours to give a reaction solution. The reaction solution was washed with a 3N-HCl and then with water, dried over sodium sulfate anhydride, and thereafter the solvent was evaporated and the residue was purified by the silica gel column chromatography (eluent; toluene) to give 25.4 g (Y., 65.1%) of 6-bromohexyl acrylate. GC; 95.9%

(b) The synthesis of

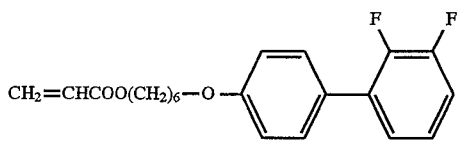

Into a reactor, 4 g of 2,3-difluoro-4'-hydroxybiphenyly obtained in the above-described synthesis (d) of Example 1, 5.0 g of 6-bromohexyl acrylate obtained in the above-described synthesis (a), 5.4 g of $K_2CO_3$ and 400 ml of 2-butanone were charged, and further stirred and refluxed for 28 hours to give a reaction solution.

The reaction solution was poured into water, extracted with toluene, washed with water, dried over sodium sulfate anhydride, and thereafter the solvent was evaporated and the residue was purified by the silica gel column chromatography (eluent; toluene), and then recrystallized twice from hexane to give 5.35 g (Y., 76.5%) of 2,3-difluoro-4'-[6-(acryloyloxy)hexyloxy]biphenyl. m.p.; 45.6°–46.8° C.

The purity of this material was 99.0% measured by GC, 99.0% measured by HPLC, and 1 spot measured by TLC. Also, according to the results of the IR measurement, the fact that a molecular ion peak was observed in 360 by the Mass analysis, and the types of the starting materials used, the resulting material was identified as a marked material.

Example 3

(a) The synthesis of $CH_2=CHCOO(CH_2)_{12}Br$

The same procedure as in the synthesis (a) of Example 2 was repeated except that 44.0 g of 12-bromo-1-dodecanol were used instead of 30 g of 6-bromo-1-hexanol to give 39.8 g (Y., 75.1%) of 12-bromododecyl acrylate.

(b) The synthesis of

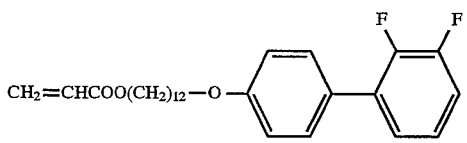

The same procedure as in the synthesis (b) of Example 2 was repeated except that 6.7 g of 12-bromododecyl acrylate were used instead of 5.0 g of 6-bromohexyl acrylate to give 2.1 g (Y., 24.1%) of 2,3-difluoro-4'-[12-(acryloyloxy)dodecyloxy]biphenyl. m.p.; 59.7°–60.7° C.

The purity of this material was 99.4% measured by HPLC, and 1 spot measured by TLC. Also, according to the results of the IR measurement, the fact that a molecular ion peak was observed in 444 by Mass analysis, and the types of the starting materials used, the resulting material was identified as a marked material.

Example 4

(a) The synthesis of

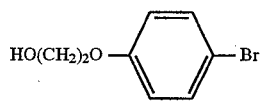

In a reactor, 10.0 g of 4-bromophenol, 7.95 g of ethylene bromohydrin, 16.0 g of $K_2CO_3$, and 300 ml of acetone were charged, and stirred and refluxed for 50 hours to give a reaction solution. The reaction solution was poured into water, extracted with toluene, washed with water, and thereafter dried over sodium sulfate anhydride, and the solvent was evaporated and the residue was distilled under reduced pressure in GTO (glass tube oven) to give 5.55 g (Y., 44.3%) of 1-bromo-4-(2-hydroxyethoxy)benzene. GC; 96.8% b.p.; 100° C./0.1 mmHg (which was the prescribed temperature of GTO)

(b) The synthesis of

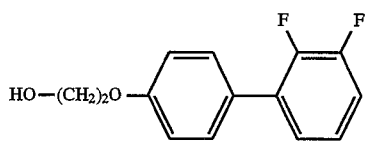

Into a reactor, a solution of 5.0 g of 4-(2-hydroxyethyl)oxy-bromobenzene in 150 ml of benzene, 7.2 g of 2,3-difluorophenyl boronic acid obtained in the synthesis (b) of Example 1, 68 ml of a 2M aqueous solution of $Na_2CO_3$, and 1.0 g of $Pd(PPh_3)_4$ were charged, and stirred and refluxed for 9 hours to give a reaction solution. The reaction solution was poured into water, extracted with toluene, washed with water, dried over sodium sulfate anhydride, and thereafter the solvent was evaporated and the residue was distilled under reduced pressure in GTO, and recrystallized from an ethanol/hexane (=1/1) mixed solvent to give 4.2 g (Y., 72.7%) of 2,3-difluoro-4'-(2-hydroxyethoxy)biphenyl.

(c) The synthesis of

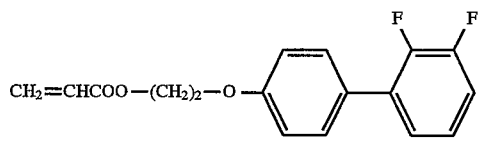

Into a reactor, 2.0 g of 2,3-difluoro-4'-(2-hydroxyethoxy)biphenyl obtained in the above-described synthesis (b), 0.9 g of triethylamine, and 300 ml of diethylether were charged, to which a solution of 0.8 g of acryloyl chloride in 100 ml of diethylether was added dropwise, while stirring and cooling with ice, and stirred for 4 hours to give a reaction solution. The reaction solution was washed with a dilute hydrochloric acid and then with water, dried over sodium sulfate anhydride, and thereafter the solvent was evaporated and the residue was purified by the silica gel column chromatography (eluent; toluene) to give 0.72 g (Y., 29.6%) of 2,3-difluoro-4'- [2-(acryloyloxy)ethoxy]biphenyl. m.p.; 47.4°–50.1° C.

The purity of this material was 99.4% measured by HPLC, and 1 spot measured by TLC. Also, according to the results of the IR measurement, the fact that a molecular ion peak was observed in 304 by the Mass analysis, and the types of the starting materials used, the resulting material was identified as a marked material.

Example 5

(a) The synthesis of

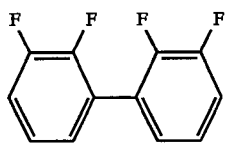

Into a reactor, 2.1 g of Pd(PPh$_3$)$_4$, a solution of 11.6 g of 1-bromo-2,3-difluorobenzene in 100 ml of benzene, 60 ml of a 2M aqueous solution of Na$_2$CO$_3$, and a solution of 13.3 g of 2,3-difluorophenyl boronic acid obtained in the synthesis (b) of Example 1 in 100 ml of ethanol were charged under an argon stream, and stirred for 6 hours under reflux condition to give a reaction solution. The reaction solution was washed with a dilute hydrochloric acid and then with water, dried over sodium sulfate anhydride, and the solvent was evaporated and the residue was distilled under reduced pressure to give 5.7 g (Y., 42%) of 2,2',3,3'-tetrafluorobiphenyl.

(b) The synthesis of

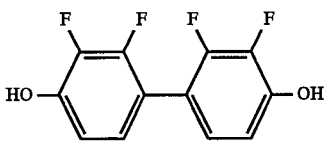

Into a reactor, 5.7 g of 2,2',3,3'-tetrafluorobiphenyl obtained in the above-described synthesis (a), and 50 ml of THF were charged under an argon stream, to which 38 ml of a 1.6M C$_4$H$_9$Li/hexane solution were added dropwise at a temperature of −50° C. or lower, and stirred at the same temperature for 2 hours, to which 10 g of (CH$_3$O)$_3$B (trimethyl borate) were added dropwise, and heated gradually to room temperature, and stirred overnight.

To the reactor, a dilute sulfuric acid was added and stirred for 1 hour, and thereafter extracted with an ether, washed with water, dried over sodium sulfate anhydride, and the solvent was evaporated and recover the residue. To the residue, hexane was added, and then immersed and washed to give a crystal, to which 50 ml of THF were added to dissolve, followed by the addition of 40 ml of a 10% aqueous H$_2$O$_2$ solution. This mixture was then stirred overnight at room temperature to give a reaction solution. The reaction solution was extracted by the addition of toluene, washed with water, dehydrated with sodium sulfate anhydride, and thereafter the solvent was evaporated and recover the residue (4.3 g of the crude 2,2',3,3'-tetrafluoro-4,4'-dihydroxybiphenyl). GC; 92%

(c) The synthesis of CH$_2$=CHCOO(CH$_2$)$_8$Br

The same procedure as in the synthesis (a) of Example 2 was repeated except that 34.7 g of 8-bromo-1-octanol were used instead of 30 g of 6-bromo-1-hexanol to give 34.1 g (Y., 78%) of 8-acryloyloxy-1-bromooctane. GC; 97%

(d) The synthesis of

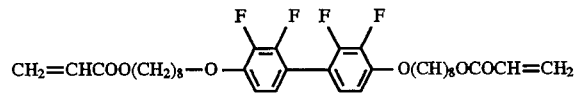

Into a reactor, 4.3 g of the crude 2,2',3,3'-tetrafluoro-4,4'-dihydroxybiphenyl obtained in the above-described synthesis (b), 10.0 g of 8-acryloyloxy-1-bromooctane obtained in the above-described synthesis (c), 7.8 g of K$_2$CO$_3$, and 30 ml of acetone were charged, and refluxed and stirred for 16 hours to give a reaction solution.

The reaction solution was filtered through a filter aid (Highflow) to give a flitrate, to which toluene was added, and washed with water, dried over sodium sulfate anhydride, and thereafter the solvent was evaporated and the residue was purified twice by the silica gel column chromatography (eluent; toluene/ethyl acetate=20/1), and then recrystallized from acetone to give 1.28 g (Y., 12.9%) of 4,4'-bis[8-(acryloyloxy)octyloxy]-2,2',3,3'-tetrafluorobiphenyl. m.p.; 60.5°–61.4° C.

The purity of this material was 99.7% measured by HPLC, and 1 spot measured by TLC. Also, according to the results of the IR measurement, the fact that a molecular ion peak was observed in 622 by Mass analysis, and the types of the starting materials used, the resulting material was identified as a marked material.

Example 6

(a) The synthesis of

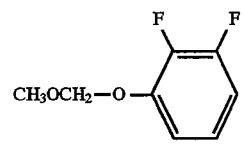

The same procedure as in the synthesis (a) of Example 1 was repeated except that 30 g of 2,3-difluorophenol were used instead of 40 g of p-bromophenol to give 32.6 g (Y., 81.4%) of methoxymethyl-2,3-difluorophenyl ether. GC; 99.6% b.p.; 82°–84° C./14 mmHg (b) The synthesis of

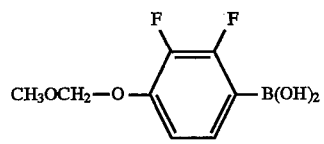

The same procedure as in the synthesis (b) of Example 1 was repeated except that 152.2 g of methoxymethyl-2,3-difluorophenyl ether obtained in the above-described synthesis (a) were used instead of 100 g of 1,2-difluorobenzene to give 150.6 g (Y., 78.8%) of 2,3-difluoro-4-(methoxymethoxy)phenyl boronic acid. HPLC; 97.4%

(c) The synthesis of

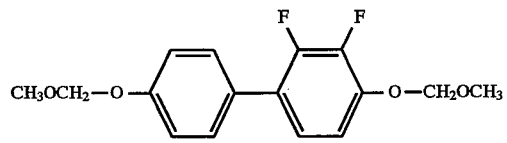

The same procedure as in the synthesis (c) of Example 1 was repeated except that 32.7 g of 2,3-difluoro-4-(methoxymethyl)oxyphenyl boronic acid obtained in the above-described synthesis (b) were used instead of 24 g of 2,3-difluorophenyl boronic acid to give 23.4 g (Y., 95.0%) of 2,3-difluoro-4,4'-bis(methoxymethoxy)biphenyl. GC; 96%

(d) The synthesis of

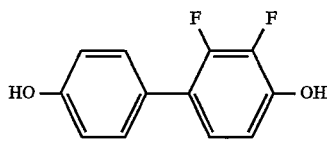

The same procedure as in the synthesis (d) of Example 1 was repeated up to the distillation step of the solvent except that 24.2 g of 2,3-difluoro-4, 4'-bis(methoxymethoxy)-biphenyl obtained in the above-described synthesis (c) were used instead of 20.1 g of 2,3-difluoro-4'-(methoxymethoxy)biphenyl to give 17 g of the residue (the crude 2,3-difluoro-4, 4'-dihydroxybiphenyl).

(e) The synthesis of

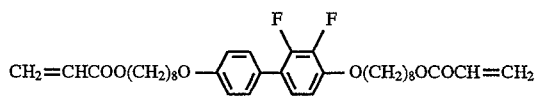

The same procedure as in the synthesis (d) of Example 1 was repeated except that 3.6 g of the crude 2,3-difluoro-4, 4'-dihydroxybiphenyl obtained in the above-described synthesis (d) were used instead of 4.3 g of 2,2',3,3'-tetrafluoro-4,4'-dihydroxybiphenyl to give 1.0 g (Y., 10.5%) of 4,4'-bis[8-(acryloyloxy)octyloxy]-2,3-difluorobiphenyl. m.p.; liquid at room temperature The purity of this material was 99.0% measured by HPLC, and 1 spot measured by TLC. Also, according to the results of the IR measurement, the fact that the molecular ion peak was observed in 586 by the Mass analysis, and the types of the starting materials used, the resulting material was identified as a marked material.

Example 7

(a) The synthesis of

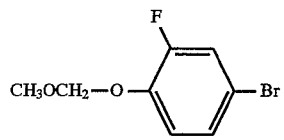

The same procedure as in the synthesis (a) of Example 1 was repeated except that 43.9 g of 2-fluoro-4-bromophenol were used instead of 40 g of p-bromophenol to give 46.7 g (Y., 86.4%) of methoxymethy 4-bromo-2-fluorophenyl ether. GC; 97.2% b.p.; 118°–120° C./14 mmHg (b) The synthesis of

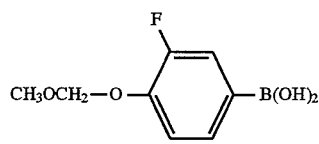

Into a reactor, 8 g of Mg, and a small number of iodine pieces were charged, to which a solution of 66 g of methoxymethy 4-bromo-2-fluorophenyl ether obtained in the above-described synthesis (a) in 300 ml of THF was added dropwise (if necessary, heated) in a small amount to commence the reaction. Thereafter, the remaining THF solution was added dropwise to the reactor while stirring and refluxing. After the termination of the dropwise addition, the solution was further stirred and refluxed for 4 hours to prepare a Grignard reagent.

Into the other reactor, 54 g of $(CH_3O)_3B$ and 200 ml of THF were charged, to which the Grignard reagent previously prepared was added dropwise while stirring at a temperature of 0° C. or lower, and gradually heated to room temperature, and thereafter stirred overnight to give a reaction solution. The reaction solution was poured into a dilute sulfuric acid, extracted with an ether, washed with a cold water, dried over sodium sulfate anhydride, and the solvent was evaporated and the residue was immersed into and washed with hexane to give 47.2 g (Y., 84.0%) of 3-fluoro-4-(methoxymethoxy)phenyl boronic acid. HPLC; 88.8%

(c) The synthesis of

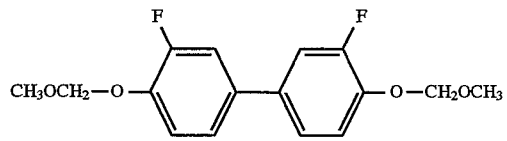

The same procedure as in the synthesis (c) of Example 1 was repeated except that 30 g of 3-fluoro-4-(methoxymethoxy)phenyl boronic acid obtained in the above-described synthesis (b) were used instead of 24 g of 2,3-difluorophenyl boronic acid, and 35.3 g of methoxymethyl 4-bromo-2-fluorophenyl ether obtained in the above-described synthesis (a) were used instead of 33 g of methoxymethyl-4-bromophenylether to give 31.9 g (Y., 68.7%) of 3,3'-difluoro-4,4'-bis(methoxymethoxy)biphenyl. GC; 99% m.p. 76.3°–77.3° C.

(d) The synthesis of

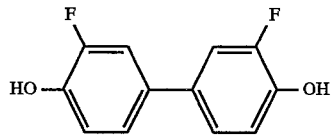

The same procedure as in the synthesis (d) of Example 1 was repeated except that 24 g of 3,3'-difluoro-4,4'-bis(methoxymethoxy)biphenyl obtained in the above-described synthesis (c) were used instead of 20.1 g of 2,3-difluoro-4'-(methoxymethoxy)biphenyl to give 17.0 g (Y., 98%) of the crude 3,3'-difluoro-4,4'-dihydroxybiphenyl GC; 99.6%

(e) The synthesis of

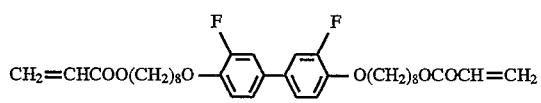

The same procedure as in the synthesis (d) of Example 5 was repeated except that 3.6 g of the crude 3,3'-difluoro-4, 4'-dihydroxybiphenyl obtained in the above-described synthesis (d) were used instead of 4.3 g of 2,2',3,3'-tetrafluoro-4,4'-dihydroxybiphenyl to give 0.34 g (Y., 3.6%) of 3,3'-difluoro-4,4'-bis[8-(acryloyloxy)octyloxy]biphenyl. m.p.; 56.1°–57.9° C.

The purity of this material was 99.5% measured by HPLC, and 1 spot measured by TLC. Also, according to the results of the IR measurement, the fact that a molecular ion peak was observed in 586 by the Mass analysis, and the types of the starting materials used, the resulting material was identified as the marked material.

Example 8

(a) The synthesis of

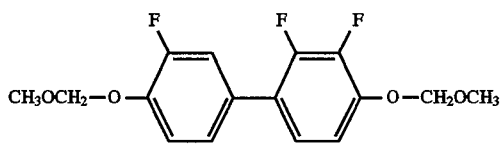

The same procedure as in the synthesis (c) of Example 1 was repeated except that 32.7 g of 2,3-difluoro-4-(methoxymethoxy)phenyl boronic acid obtained in the synthesis (b) of Example 6 were used instead of 24 g of 2,3-difluorophenyl boronic acid, and 35.7 g of methoxymethyl 4-bromo-2-fluorophenyl ether obtained in the synthesis (a) of Example 7 were used instead of 33 g of methoxymethyl 4-bromophenyl ether to give 20.5 g (Y., 50%) of 2,3,3'-trifluoro-4,4'-bis(methoxymethoxy)biphenyl. GC; 95%

(b) The synthesis of

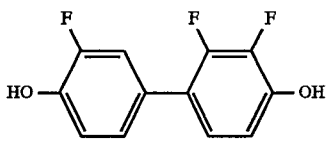

The same procedure as in the synthesis (d) of Example 1 was repeated up to the distillation step of the solvent except that 21.7 g of 2,3,3'-trifluoro-4,4'-bis(methoxymethoxy)biphenyl obtained in the above-described synthesis (a) were used instead of 20.1 g of 2,3-difluoro-4'-(methoxymethoxy)biphenyl to give 14.7 g of the crude 2,3,3'-trifluoro-4,4'-dihydroxybiphenyl.

(c) The synthesis of

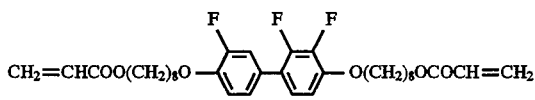

The same procedure as in the synthesis (d) of Example 5 was repeated except that 3.4 g of the crude 2,3,3'-trifluoro-4,4'-dihydroxybiphenyl obtained in the above-described synthesis (b) were used instead of 4.3 g of 2,2',3,3'-tetrafluoro-4,4'-dihydroxybiphenyl to give 9 g (Y., 90%) of 2,3,3'-trifluoro-4,4'-bis[8-(acryloyloxy)octyloxy]biphenyl. m.p,; liquid at room temperature The purity of this material was 99% measured by HPLC, and 1 spot measured by TLC. Also, according to the results of the IR measurement, the fact that a molecular ion peak was observed in 604 by the Mass analysis, and the types of the starting materials used, the resulting material was identified as a marked material.

Examples 9–13

(The liquid crystal display elements using a monofunctional liquid crystal polymeric material)

A cell was prepared using 1.1 mm glass substrates having ITO (a mixture of indium oxide and tin oxide; having a thickness of 500 angstrom) transparent electrodes while maintaining a 5 μm gap with a spacer. On one side of the cell thus prepared, the photo-mask 3 was disposed as shown in FIG. 5. Moreover, a uniform mixture of 0.65 g of stearyl acrylate, 0.15 g of 1,4-butanediol acrylate, 0.10 g of styrene, 0.10 g of the polymeric compound X shown in Table 1, 13.3 g of a liquid crystal material, ZLI-4792 (manufactured by Merck, Inc.; Δn=0.094), and 0.04 g of a photoinitiator (Irgacure 651) was injected into the cell by a capillary tube.

TABLE 1

| Compound X | Value of n | Example No. |
|---|---|---|
| CH₂=CHCOO(CH₂)ₙ—O—[ring]—[ring] (F, F substituents) | 12 | 8 |
| | 6 | 9 |
| | 4 | 10 |
| | 2 | 11 |
| | 0 | 12 |

Then, while impressing a ±4 V electric voltage between the transparent electrodes, the cell was irradiated with a parallel light from a high pressure mercury lamp at a rate of 10 mW/cm$^2$ at 100° C. for 8 minutes (The ultraviolet ray was irradiated to create a spatially regular pattern to the cell).

Then, the cell was gradually cooled to 25° C. (at which the liquid crystal was in a nematic state) at a rate of 10° C./hr. while impressing an electric voltage, and further irradiated continuously with the ultraviolet ray for 3 minutes to cure the resin to prepare a liquid crystal display element.

When the resulting element was observed by a polarization microscope, it was observed that the liquid crystal regions 20 were formed in the portions corresponding to the photo-mask and that the liquid crystal molecules were spirally oriented around a central axis which was located in the center of the liquid crystal region, as shown in FIG. 6. A polarizing plate was attached to each substrate of the cell so that they were at a right angle to each other. FIGS. 7A–7F show the electrooptical characteristics of the cell obtained in Example 11. The electrooptical characteristics of the cells obtained in other examples (Examples 9, 10, 12 and 13) generally showed the same trend as those shown in FIGS. 7A–7F.

The generation of disclination lines was substantially perfectly controlled in the cells of Examples 9–11, but a few disclination lines were generated in the cells of Examples 12 and 13. The transmittance of the cell of Example 9 in the absence of an electric voltage was significantly reduced as illustrated in Table 2. The higher the number of n in the general formula (I), the larger the transmittance of the cell.

TABLE 2

| | Example 9 | Example 10 | Example 11 | Example 12 | Example 13 |
|---|---|---|---|---|---|
| Transmittance in the absence of an electric voltage (%) | 37 | 48 | 51 | 55 | 52 |

Examples 14–17

(The liquid crystal display elements using a bifunctional liquid crystal polymeric material)

On a cell prepared by the same procedure as in Examples 9–13, a photo-mask was disposed in the same manner as in Examples 9–13. Moreover, a uniform mixture of 0.75 g of stearyl acrylate, 0.10 g of styrene, 0.15 g of the polymeric compound Y shown in Table 3, 13.3 g of a liquid crystal material, ZLI-4792 (manufactured by Merck, Inc.;

Δn=0.094), and 0.04 g of a photoinitiator (Irgacure 651) was injected into the cell by a capillary tube.

TABLE 3

| Compound Y | Value of n | Example No. |
|---|---|---|
| 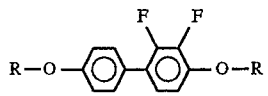 | 12<br>8<br>6 | 13<br>14<br>15 |
| R: CH₂=CHCOO(CH₂)ₙ— | | |
| 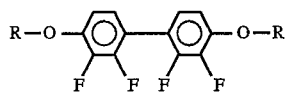 | 8 | 16 |

The cell into which the mixture was injected was irradiated with an ultraviolet ray while impressing an electric voltage in the same manner as in Examples 9–13 to prepare a liquid crystal display element.

When the element thus prepared was observed by a polarization microscope, it was observed that the liquid crystal regions 20 were formed in the portions corresponding to the photo-mask, that the liquid crystal molecules were spirally oriented around a central axis which was located in the center of the liquid crystal region, and that regions having a smaller amount of twisting were formed in the neighborhood of the liquid crystal regions, as shown in FIG. 4. When a polarizing plate was attached to each substrate of the cell so that they were at a right angle to each other, it was observed that the same viewing angle characteristics as those of Examples 9–13 were obtained.

Moreover, when an electric voltage was impressed on the resulting element, the generation of disclination lines was not observed in the element. Table 4 illustrates the electrooptical characteristics of the element thus prepared.

TABLE 4

| | Example 14 | Example 15 | Example 16 | Example 17 |
|---|---|---|---|---|
| Transmittance in the absence of an electric voltage (%) | 36 | 53 | 50 | 52 |
| Transmittance when a voltage of 10 V is applied (%) | 0.9 | 0.8 | 0.8 | 0.6 |

According to Table 4, the cell of Example 17, which was prepared from the fluoridized bifunctional liquid crystal polymer material, has a lower transmittance at the time of impressing an electric voltage, and exhibits excellent display characteristics. This is because (1) the cell of Example 17 provides more double refractions of the remaining liquid crystal materials than the cells of Examples 9–13, and (2) the liquid crystal molecules were not easily dissolved in the polymer film attached on the substrates by using the fluoridized liquid crystal material, thereby reducing an anchoring strength to the surface of the polymer film, as observated with the polarization microscope.

Comparative Example 1

On the cell prepared in Example 9, a photo-mask 3 was disposed as shown in FIG. 5. Moreover, a uniform mixture of 0.75 g of stearyl acrylate, 0.15 g of 1,4-butanediol acrylate, 0.10 g of styrene, 13.3 g of a liquid crystal material, ZLI-4792 (manufactured by Merck, Inc.; Δn=0.094), and 0.04 g of a photoinitiator (Irgacure 651) was injected into the cell by a capillary tube.

Then, the cell was irradiated with an ultraviolet ray, while impressing an electric voltage in the same manner as in Examples 9–13 to prepare a liquid crystal display element.

When an electric voltage was impressed on the element thus prepared, the generation of disclination lines was observed by a polarization microscope. Moreover, the transmittance of the cell at the time of impressing an electric voltage was 2.2%. Since this value was greater than those of the cells of Examples 14–17, it was believed that the increase of the transmittance is due to the generation of disclination lines.

Example 18

A polyimide film (AL4552; manufactured by Nihon Synthetic Rubber, Inc.) was applied to 1.1 mm glass substrates having ITO (a mixture of indium oxide and tin oxide; having a thickness of 500 angstrom) transparent electrodes formed by the spin coating method, and subjected to the rubbing treatment with a nylon cloth. These two substrates thus prepared were attached to each other through a 5 μm spacer so that the rubbing directions were at a right angle to each other.

On the surface of the cell thus prepared, a photo-mask 3 was disposed as shown in FIG. 5. Moreover, a uniform mixture of 0.55 g of stearyl acrylate, 0.15 g of 1,4-butanediol acrylate, 0.20 g of styrene, 0.10 g of the polymeric compound X used in Example 11, 13.3 g of a liquid crystal material, ZLI-4792 (manufactured by Merck, Inc.; Δn=0.094; the twist angle was adjusted to 90° by using a chiral material;, S811), and 0.04 g of a photoinitiator (Irgacure 651) was injected into the cell by a capillary tube. Then, a TN mode liquid crystal display element having liquid crystal regions surrounded by a polymer wall was prepared by the same procedure as in Examples 9–13.

Polarizing plates were attached to both surfaces of the element thus prepared so that the polarization axes of the polarizing plates corresponded to the respective rubbing direction.

The liquid crystal of the element thus prepared was in the TN orientation with a uniform orientation state. Moreover, the display characteristics of the element were not varied, even when the outer surface of the element was pressed by a pen.

Example 19

A polyimide film (Sunever; manufactured by Nissan Chemical, Inc.) was applied to 1.1 mm glass substrates having ITO (a mixture of indium oxide and tin oxide; having a thickness of 500 angstrom) transparent electrodes formed by the spin coating method, and subjected to the rubbing treatment with a nylon cloth. These two substrates thus prepared were attached to each other through a 9 μm spacer so that the rubbing directions were at an angle of 240° to each other.

On the surface of the cell thus prepared, a photo-mask 3 was disposed as shown in FIG. 5. Moreover, a uniform mixture of 0.55 g of stearyl acrylate, 0.15 g of 1,4-butanediol acrylate, 0.20 g of styrene, 0.10 g of the polymeric compound X used in Example 11, 13.3 g of a liquid crystal material, ZLI-4427 (manufactured by Merck, Inc.; the twist angle was adjusted to 240° by using a chiral material, S811), and 0.04 g of a photoinitiator (Irgacure 651) was injected into the cell by a capillary tube. Then, a STN mode liquid crystal display element having liquid crystal regions surrounded by a polymer wall was prepared by the same procedure as in Examples 9–13.

Polarizing plates were attached to both surfaces of the element thus prepared so that each of the polarization axes of the polarizing plates was at an angle of 45° from the rubbing direction and they were at an angle of 105° to each other.

The liquid crystal of the element thus prepared was in the STN orientation with a uniform orientation state. Moreover, the display characteristics of the element were not varied, even when the outer surface of the element was pressed by a pen.

Example 20

A polyimide film (Sunever; manufactured by Nissan Chemical, Inc.) was applied to 1.1 mm glass substrates having ITO (a mixture of indium oxide and tin oxide; having a thickness of 500 angstrom) transparent electrodes formed by the spin coating method, and subjected to the rubbing treatment with a nylon cloth. These two substrates thus prepared were attached to each other through a 2 μm spacer so that the rubbing directions were at a right angle to each other.

On the surface of the cell thus prepared, a photo-mask 3 was disposed as shown in FIG. 5. Moreover, a uniform mixture of 0.02 g of polyethyleneglycol diacrylate (NK-ester A-200; manufactured by Shin-Nakamura Chemical Industries, Inc.), 0.09 g of lauryl acrylate, 0.01 g of styrene, 0.08 g of the polymeric compound X used in Example 11, 0.80 g of a liquid crystal material, ZLI-4003 (manufactured by Merck, Inc.), and 0.005 g of a photoinitiator (Irgacure 651) was injected into the cell by a capillary tube. Then, a FLC mode (SSF type orientation) liquid crystal display element having liquid crystal regions surrounded by a polymer wall was prepared by the same procedure as in Examples 9–13.

Polarizing plates were attached to both surfaces of the element thus prepared so that the polarization axes of the polarizing plates were at an angle of 90° to each other.

The liquid crystal of the element thus prepared was in the SSF orientation with a uniform orientation state. Moreover, the display characteristics of the element were not varied, even when the outer surface of the element was pressed by a pen. Moreover, no disturbance of the orientation which was generated in ordinary FLC mode elements occured when the surface of the element was pressed.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A polymeric compound represented by the following general formula (I):

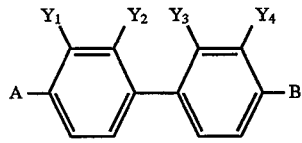

wherein A represents

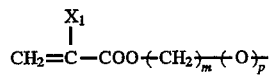

B represents a hydrogen atom,

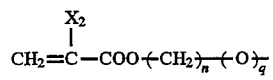

$X_1$ represents a hydrogen atom or a methyl group, m represents and integer of 0 to 14, p represents 0 to 1, and each of $Y_1$, $Y_2$, $Y_3$, and $Y_4$, represents independently a hydrogen atom or a fluorine atom, wherein two or more of $Y_1$, $Y_2$, $Y_3$, and $Y_4$ are fluorine atoms, with the proviso that p is 0 when m is 0.

2. The polymeric compound of claim 1, wherein in the general formula (I) A represents:

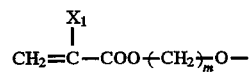

3. A liquid crystal display element comprising a pair of substrates oppositely disposed with a gap therebetween, and a liquid crystal layer placed in said gap, at least one of said substrates being transparent, and said liquid crystal layer having a liquid crystal region, and a polymer wall surrounding said liquid crystal region, wherein said liquid crystal layer includes a liquid crystal material, a polymeric polymer material, and the polymeric compound of claim 1.

4. The liquid crystal display element of claim 3, wherein said liquid crystal region comprises liquid crystal molecules, and the orientation of said liquid crystal molecules is either random, radial, concentric or spiral.

5. The liquid crystal display element of claim 3, wherein an alignment film is placed on said substrates.

6. The liquid crystal display element of claim 3, wherein said liquid crystal region comprises liquid crystal molecules, and the orientation of said liquid crystal molecules is TN, STN, ECB or FLC.

7. The liquid crystal display element of claim 3, wherein said polymeric polymer material is a photocurable resin.

* * * * *

UNITED STATES PATENT AND TRADEMARK OFFICE
CERTIFICATE OF CORRECTION

PATENT NO. : 5,645,760
DATED : July 8, 1997
INVENTOR(S) : Yamada, et al.

It is certified that error appears in the above-identified patent and that said Letters Patent is hereby corrected as shown below:

Column 30, line 20, delete the formula:

Signed and Sealed this

Seventeenth Day of February, 1998

Attest:

BRUCE LEHMAN

Attesting Officer

Commissioner of Patents and Trademarks